United States Patent [19]
Anderson

[11] 3,971,763

[45] *July 27, 1976

[54] PLASTIC COMPOSITIONS CONTAINING POLYESTERS AND A BIS-PHENOXY FLAME RETARDANT

[75] Inventor: Arnold L. Anderson, Alma, Mich.

[73] Assignee: Michigan Chemical Corporation, Chicago, Ill.

[ * ] Notice: The portion of the term of this patent subsequent to July 27, 1993, has been disclaimed.

[22] Filed: Feb. 8, 1973

[21] Appl. No.: 330,899

Related U.S. Application Data

[63] Continuation-in-part of Ser. No. 260,240, June 6, 1972, abandoned.

[52] U.S. Cl. .................. 260/45.9 KA; 260/17 R; 260/42; 260/42.22; 260/42.26; 260/45.9 E; 260/45.9 QB; 260/45.95 G; 260/45.75 R; 260/DIG. 24

[51] Int. Cl.² ....................................... C08K 5/05

[58] Field of Search ............. 260/45.9 R, 45.95 G, 260/613 B, 33.2 R, 2.5 AJ, DIG. 24, 45.9 KA, 45.9 E, 45.9 QB; 106/15 FP

[56] References Cited
UNITED STATES PATENTS

| | | | |
|---|---|---|---|
| 3,385,819 | 5/1968 | Gouinlock | 260/45.75 R |
| 3,560,441 | 2/1971 | Schwarcy et al. | 260/45.7 R |
| 3,658,634 | 4/1972 | Yanagi et al. | 161/403 |
| 3,717,609 | 2/1973 | Kutner | 260/45.95 G |

*Primary Examiner*—M. J. Welsh
*Attorney, Agent, or Firm*—Robert M. Phipps; James J. Mullen

[57] ABSTRACT

Plastic compositions containing polyesters and bis-phenoxy compounds having the formula

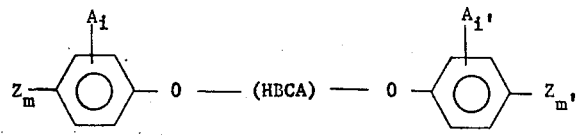

wherein Z is bromine or chlorine, $m$ and $m'$ are integers having a value of 1–5, $i$ and $i'$ are integers having a value of 0–2, HBCA is a halo-branched chain alkylene group having from 1 to 6 carbon atoms and A is cyano, nitro, lower alkoxy, lower alkyl, fluorine, dialkylamino, phenyl, halo-phenyl, benzyl or halo-benzyl.

14 Claims, No Drawings

PLASTIC COMPOSITIONS CONTAINING POLYESTERS AND A BIS-PHENOXY FLAME RETARDANT

This application is a continuation-in-part of copending application Ser. No. 260,240, filed June 6, 1972 and now abandoned. The entire specification of this case, Ser. No. 260,240, is to be considered as incorporated herein by reference.

The prior art considered in conjunction with the preparation of this application is as follows: U.S. Pat. Nos. 2,130,990; 2,186,367; 2,329,033; 3,666,692; 3,686,320; 3,658,634; German patent No. 1,139,636; German patent No. 2,054,522; Japanese patent No. (72) 14,500 as cited in Vol. 77, Chemical Abstracts, col. 153737k (1972); Chemical Abstracts, Vol. 13, col. 448[5]; Chemical Abstracts, Vol. 31, col. 7045[9]; and Journal of the Chemical Society, pgs. 2972–2976 (1963). All of these publications are to be considered as incorporated herein by reference.

The present invention relates to plastic compositions containing saturated or unsaturated polyesters (both types herein referred to collectively as polyesters). More specifically, the present invention covers plastic compositions containing polyesters and certain bis-phenoxy compounds (hereinafter defined) as flame retardants for said plastic compositions.

Polyester plastics (also commonly called resins) and utility thereof are known in the art as exemplified by *Polyesters and Their Applications*, Bjorksten Research Laboratories, Inc., Reinhold Publishing Corporation, New York, 1956, and *Modern Plastics Encyclopedia 1972–1973*, Vol. 49: No. 10A, October, 1972, pgs. 73, 76, 78, 79 and 156–158 and which publications are in toto incorporated herein by reference.

The need for flame retarding polyesters has also been recognized in the art as exemplified by U.S. Pat. Nos. 3,347,822 and 3,422,048, and Modern Plastics Encyclopedia, ibid, pgs. 217, 224–229, 235 and 456–458 and which publications are in toto incorporated herein by reference.

The resultant disadvantages in the utilization of various prior art materials as flame retardants for polyesters include, without limitation, factors such as thermal migration, heat instability, light instability, non-biodegradable, toxicity, discoloration and the large amounts employed in order to be effective. Thus, there is always a demand for a material which will function as a flame retardant in polyesters and concurrently will not, incorporation therein, adversely effect the chemical and/or physical and/or mechanical properties of the resultant polyester plastic composition.

The prior art problem of providing a flame retarded polyester composition having desired chemical, physical and mechanical properties has now been substantially solved by the present invention and the above-described disadvantages substantially overcome.

Accordingly, one of the main objects of the present invention is to provide polyester plastic compositions which are flame retarded.

Another object of the present invention is to provide a material for polyester plastic compositions which will not substantially adversely effect the chemical and/or physical and/or mechanical properties of said compositions.

A further object of the present invention is to provide a flame retardant which is economic and easy to incorporate into polyester plastics without being degraded or decomposed as a result of blending or processing operations.

It has been found that the foregoing objects can be obtained by the incorporation of a new class of bis-phenoxy compounds in polyester to subsequently provide flame retarded compositions which exhibit outstanding chemical, physical and mechanical properties.

The bis-phenoxy compounds used in the present invention compositions have the formula:

(I)

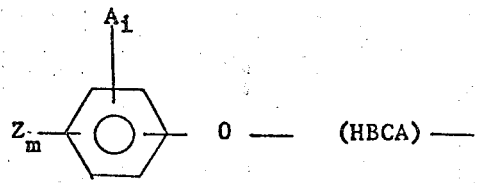

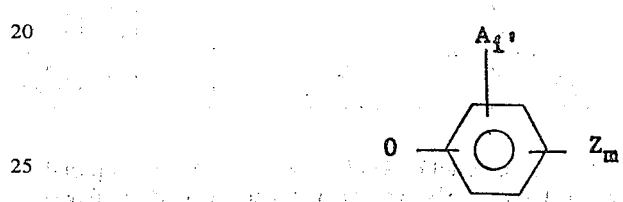

In Formula I above, Z is bromine or chlorine; $m$ and $m'$ are integers each independently having a value of 1–5; $i$ and $i$ are integers each independently having a value of 0–2; HBCA is a halo-branched chain alkylene group having from 1 to 6 carbon atoms (e.g. $CH_2C(CH_2Cl)H$; $CH_2C(CH_2Cl)_2$; $CH_2CH_2C(CH_2Br)H$; and $CH_2C(CH_2Cl)HCH_2$); and A is from the group, cyano (—CN), nitro (—$NO_2$), lower alkoxy (e.g. —$OCH_3$, $OC_2H_5$), lower alkyl (e.g. $CH_3$, $C_2H_5$, $C_3H_7$, $C_4H_9$), fluorine, dialkylamino e.g. —$N(CH_3)_2$ —$N(C_2H_5)_2$, phenyl (—$C_6H_5$), halo-phenyl, benzyl (—$CH_2C_6H_5$), and halo-benzyl.

In Formula I, the sum of $i + m$ or $i' + m'$ is not greater than 5.

It is to be understood that all of the compounds falling within the above Formula I and as heretofore defined are generically described herein as "bis-phenoxy" compounds.

Illustrative (but without limitation) of some of the present invention bis-phenoxy compounds are shown below:

(I)

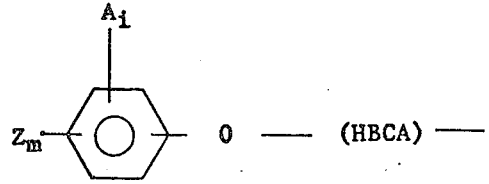

the exemplary definition of A, Z, $i$, $i'$, $m$, $m'$ and HBCA are listed in Table I.

Table I

| Compound No. | Z  | m | m' | A           | i | i' | HBCA                  |
|--------------|----|---|----|-------------|---|----|-----------------------|
| 1            | Br | 3 | 3  | —           | 0 | 0  | $CH_2C(CH_2Cl)H$      |
| 2            | Br | 3 | 3  | —           | 0 | 0  | $CH_2C(CH_2Cl)_2$     |
| 3            | Br | 5 | 5  | —           | 0 | 0  | $CH_2C(CH_2Cl)H$      |
| 4            | Br | 2 | 2  | —CN         | 1 | 1  | $CH_2CH_2C(CH_2Br)H$  |
| 5            | Br | 2 | 2  | —$NO_2$     | 1 | 1  | $CH_2C(CHCl_2)H$      |
| 6            | Cl | 2 | 2  | —$OCH_3$    | 1 | 1  | $CH_2C(CH_2Cl)H$      |
| 7            | Br | 3 | 3  | —$OCH_3$    | 1 | 1  | $(CH_2)_3C(CH_2Cl)_2$ |
| 8            | Br | 2 | 2  | —$CH_3$     | 1 | 1  | $CH_2C(CH_2Cl)H$      |
| 9            | Br | 2 | 2  | F           | 1 | 1  | $CH_2C(CH_2Cl)_2$     |
| 10           | Br | 2 | 2  | —$N(CH_3)_2$| 1 | 1  | $CH_2C(CHBr_2)H$      |
| 11           | Br | 2 | 2  | —$C_6H_5$   | 1 | 1  | $(CH_2)_2C(CBr_3)H$   |
| 12           | Cl | 2 | 2  | —$C_6H_3Br_2$| 1 | 1  | $CH_2C(CH_2Cl)H$     |
| 13           | Br | 2 | 2  | —$CH_2C_6H_5$| 1 | 1  | $CH_2C(CCl_3)_2$     |
| 14           | Br | 2 | 2  | —$CH_2C_6H_3Br_2$| 1 | 1 | $CH_2C(CH_2Cl)H$   |
| 15           | Cl | 3 | 3  | —$C_6H_3Cl_2$| 1 | 1  | $CH_2C(CH_2Cl)H$     |
| 16           | Br | 3 | 3  | F           | 1 | 1  | $CH_2C(CCl_3)_2$      |
| 17           | Cl | 5 | 5  | —           | 0 | 0  | $CH_2C(CH_2Cl)H$      |
| 18           | Br | 4 | 4  | —           | 0 | 0  | $CH_2C(CH_2Cl)H$      |
| 19           | Br | 3 | 3  | —$C_6H_2Br_3$| 1 | 1  | $(CH_2)_3C(CH_2Cl)_2$|
| 20           | Br | 3 | 3  | —           | 0 | 0  | $CH_2C(CH_2Cl)HCH_2$  |
| 21           | Br | 2 | 2  | —           | 0 | 0  | $CH_2C(CCl_3)H$       |
| 22           | Br | 4 | 4  | —           | 0 | 0  | $CH_2C(CHBr_2)H$      |
| 23           | Br | 3 | 3  | F           | 2 | 2  | $CH_2C(CH_2Cl)H$      |
| 24           | Br | 1 | 1  | —$C_4H_9$   | 1 | 1  | $CH_2C(CH_2Cl)H$      |
| 25           | Br | 1 | 1  | —$OC_4H_9$  | 1 | 1  | $(CH_2)_3C(CH_2Cl)H$  |

In general, the bis-phenoxy compounds are prepared by first reacting a halogenated phenol with a halogenated alkanol at elevated temperatures in the presence of a basic material such as alkali metal hydroxides, carbonates, bicarbonates, oxides and hydrides to form an intermediate product. The preferred alkali metals are potassium and sodium. Where one desires to increase, for example, ease of handling the intermediate reaction mass, solvents such as ketones (e.g. acetone, methyl ethyl ketone, and methyl iso-butyl ketone), alcohols (e.g. methanol, ethanol, iso-propyl alcohol, butyl alcohol and glycols), or aqueous solvents (e.g. water, a mixture of water and alcohol and a mixture of water and ketone) can be employed. The intermediate product is separated from the first reaction medium via, for example, filtration. This product is then contacted with a halogenating agent such as $SOCl_2$, $PCl_3$, $PCl_5$, $PBr_3$, $PBr_5$, $(C_6H_5)_3 PBr_2$ and the like. Preferably this second step is carried out in a reaction medium such as an aromatic solvent. The desired end product i.e. the bis-phenoxy compound, can be recovered from the reaction mass via various methods such as distillation or crystallization. Where the end product requires recovery via crystallization, the aromatic solvent containing the halogenating agent is, for example, benzene, toluene, xylene, dichlorobenzene and the like.

Specifically, the bis-phenoxy compounds are prepared according to the following reactions:

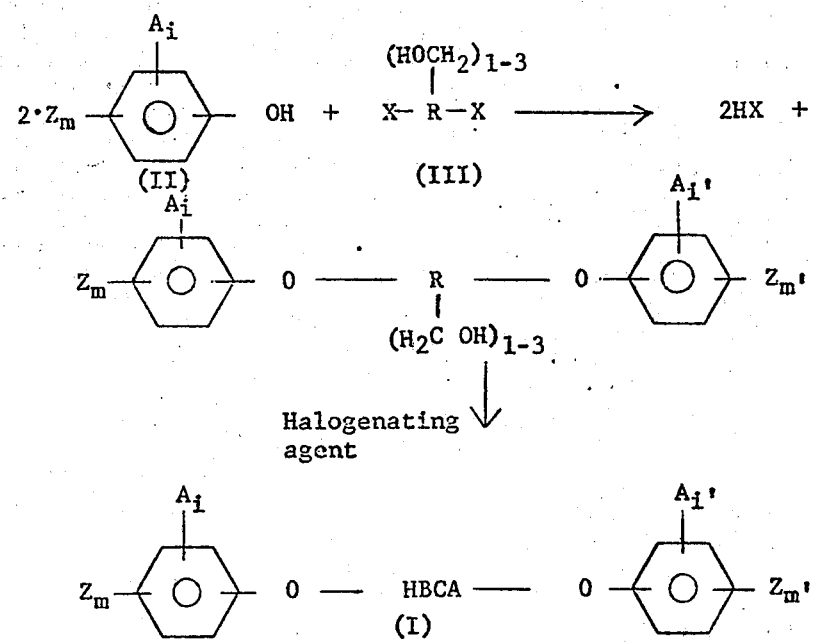

In the above reaction, X is halogen, preferably chlorine and R is an alkylene having $C_3$-$C_6$. Where m and m' and i and ' are different integers, then equivalent molar portions of the particular halogenated phenol are used with equivalent portions of dissimilar halogenated phenol.

The above reaction is conducted at temperatures ranging from the freezing point of the initial reaction mass to the boiling point thereof. Preferably the temperatures are from about 40° C to about 200° C and more preferably from about 50° C to about 175° C. It is to be understood that the reaction can be conducted under sub-atmospheric (e.g. 1/10–8/10 atmospheres), atmospheric or super-atmospheric (e.g. 1.5–10 atmospheres) pressure. Preferably, the reaction is carried out at atmospheric pressure.

The above-described processes can be carried out with conventional, readily available chemical processing equipment. For example, a conventional glass-lined vessel provided with heat transfer means, a reflux condenser and a mechanical stirrer can be advantageously utilized in practicing any of the preferred embodiments of the invention described in the examples set forth herein.

The amount of bis-phenoxy compound employed in the present invention compositions is any quantity which will effectively render the polyester containing composition flame retardant. In general, the amount used is from about 1% to 25% by weight, based on the total weight of the composition. Preferably, the amount employed is from about 5% to about 20% by weight. It is to be understood that any amount can be used as long as it does not substantially adversely effect the chemical and/or physical and/or mechanical properties of the end polymer composition. The amount utilized, however, is such amount which achieves the objectives described herein.

It is to be understood that the term polyesters as used herein means polycondensate products of the reaction of dibasic acids and/or anhydrides or derivatives therefrom with dihydroxy alcohols. This term includes both saturated and unsaturated polyesters but excludes those linear polyesters used for fibers. Unsaturated polyesters are so designated where part or all of the respective acids, anhydrides and/or alcohols contain crosslinkable ethylenic bonds.

Examples of dibasic acids and anhydrides include, without limitation, phthalic anhydride, maleic anhydride, fumaric acid, tetrahydrophthalic anhydride, tetrachlorophthalic anhydride, tetrabromophthalic anhydride, 1,4,5,6,7,7-hexachlorobicyclo (2,2,1)-5-heptene-2,3-dicarboxylic acid i.e. chlorendic acid, isophthalic acid and terephthalic acid.

Examples of dihydroxy alcohols include, without limitation, ethylene glycol, diethylene glycol, propylene glycol, butane glycol, butene diol, hexane diol, hexene diol, butyne diol, cyclohexane diol, cyclohexene diol, neopentyl glycol, hydrogenated bisphenol A, 2,2,4-trimethyl-1,3-pentanediol and 1,4-cyclohexanedimethanol.

This term also includes copolymers of polyesters which are resins derived from reactants used to give polyester resins and reactants used to give other polycondensate linkages. For example, there may be mentioned the reaction of dibasic anhydrides with dihydroxy alcohols and diamines to give polyester and polyamide links along the same molecular backbone. Also, those products formed by addition polymerization of reactants with ethylenic linkages before or after the polyester condensation reaction. For example, the addition reaction of styrene with unsaturation in polyesters after polycondensation or the formation of an additional polymer with carboxylic acid or other condensable end-groups for further polymerization by polyesterification.

Thus the polyesters used in the present invention compositions is any polyesters herein defined and which one so desires to flame retard. It is to be understood that the polyesters used can be a "virgin" material, i.e. substantially free of additives such as stabilizers, plasticizers, dyes, pigments, fillers, and the like, or the polyesters can have additives (such as those mentioned and described herein) already contained therein or added concurrently with or after the addition of the bis-phenoxy compounds.

Another facet of the present invention relates to the use of certain metal compounds with the bis-phenoxy compounds to promote a cooperative effect therebetween and thus enhance the flame retardancy of the resultant plastic composition as compared to the flame retardancy of either one component used separately. These "enhancing agents" are from the group antimony, arsenic, bismuth, tin and zinc-containing compounds. Without limitation, examples of said enhancing agents include $Sb_2O_3$, $SbCl_3$, $SbBr_3$, $SbI_3$, $SbOCl$, $As_2O_3$, $As_2O_5$, $ZnBO_4$, $BaB_2O_4 \cdot H_2O$, $2 \cdot ZnO \cdot 3B_2O_3 \cdot 3.5-H_2O$ and stannous oxide hydrate. The preferred enhancing agent is antimony trioxide.

The amount of enhancing agent employed in the present invention compositions is any amount which when used with said bis-phenoxy compounds will promote a cooperative effect therebetween. In general, the amount employed is from about 1% to about 15%, preferably from about 2% to about 10%, by weight, based on the total weight of plastic composition. Higher amounts can be used as long as the desired end result is achieved.

It is also within the scope of the present invention to employ other materials in the present invention compositions where one so desires to achieve a particular end result. Such materials include, without limitation, adhesion promotors; antioxidants; antistatic agents; antimicrobials; colorants; flame retardants such as those listed on pgs. 456–458, Modern Plastics Encyclopedia, ibid, (in addition to the new class of flame retardants described herein); heat stabilizers; light stabilizers; pigments; plasticizers; preservatives; ultraviolet stabilizers and fillers.

In this latter category, i.e. fillers, there can be mentioned without limitation, materials such as glass; carbon; cellulosic fillers (wood flour, cork and shell flour); calcium carbonate (chalk, limestone, and precipitated calcium carbonate); metal flakes; metallic oxides (aluminum, beryllium oxide and magnesia); metallic powders (aluminum, bronze, lead, stainless steel and zinc); polymers (comminuted polymers and elastomer-plastic blends); silica products (diatomaceous earth, novaculite, quartz, sand, tripoli, fumed colloidal silica, silica aerogel, wet process silica); silicates (asbestos, kaolimite, mica, nepheline syenite, talc, wollastonite, aluminum silicate and calcium silicate); and inorganic compounds such as barium ferrite, barium sulfate, molybdenum disulfide and silicon carbide.

The above mentioned materials, including fillers, are more fully described in Modern Plastics Encyclopedia, ibid, and which publication is incorporated herein (in toto) by reference.

The amount of the above described materials employed in the present invention compositions can be any quantity which will not substantially adversely effect the desired results derived from the present invention compositions. Thus, the amount used can be zero (0) percent, based on the total weight of the composition, up to that percent at which the composition can still be classified as a plastic. In general, such amount will be from about 0% to about 75% and specifically from about 1% to about 50%.

The bis-phenoxy compounds can be incorporated into the polyesters at any processing stage in order to prepare the present invention compositions. In general, this is undertaken prior to fabrication either by physical blending or during the process of forming polyesters per se. Where one so desires, the bis-phenoxy compounds may be micronized into finely divided particles prior to incorporation into the polyesters.

EXAMPLE I

A linear saturated polyester plastic material, (Varlox 310, a product of General Electric Company) is utilized as the base resin in order to prepare 26 formulations (plastic compositions) designated Nos. 1-26 in Table II. With the exception of formulation No. 1 (the control), the particular bis-phenoxy (and the antimony trioxide enhancing agent where indicated) is incorporated into the plastic by adding both to a Brabender mixer ("Plastic-Corder", Torque Rheometer, Model PLV-150, C. W. Brabender Instruments Inc., South Hackensack, N. J.). The mixer is equipped with a pair of roller type blades positioned within a head provided with heat transfer means.

The resultant mixture is heated to about 277° C.; at this temperature, it is in a molten state. The percentages by weight of each component utilized in the respective formulations are listed in Table II. Each formulation is discharged from the mixer and upon cooling solidifies and is ground into chips. The chips are subjected to compression molding in a Wabash press by placing said chips between two platens, the bottom of which contains four equal size depressions 3 inches by 5 inches by ⅛ inch deep. The top platen is then placed over the bottom platen and heat transfer means supplied thereto in order to melt said chips and thus provide solid samples (after cooling) for testing.

An unsaturated polyester plastic material, Koppers 6101-25, a liquid product of Koppers Company, is used as the base resin in order to prepare 26 formulations, designated Nos. 27-52 in Table II. The particular bis-phenoxy (and antimony trioxide where indicated) is incorporated into the unsaturated polyester by mixing with 0.1% by weight, based on the total weight of the formulation, cobalt octoate and 2.0% methyl ethyl ketone peroxide to form a liquid mixture. This mixture is poured into said depressions and cured at 100°C under slight compression by the Wabash press. Formulation No. 27, without additives, is the control.

Portions of the solid samples of each respective formulation (Nos. 1-52) prepared according to the above described procedures are then subjected to two different standard flammability tests, i.e. UL 94 and ASTM D-2863-70. The UL 94 is, in general, the application of a burner to a test specimen (strip) for a certain period of time and observation of combustion, burning, and extinguishment. This procedure is fully set forth in Underwriters' Laboratories bulletin entitled UL 94, Standard for Safety, First Edition, September 1972 and which is incorporated herein by reference. ASTM No. D-2863-70 is a flammability test which correlates the flammability of a plastic specimen to the available oxygen in its immediate environment; this correlation is stated as an Oxygen Index, O.I., level predicated upon the percent oxygen in the gaseous medium which is required to just provide a steady state of continuous burning of the plastic specimen. This ASTM method is fully described in 1971 Annual Book of ASTM Standards - Part 27, published by the American Society For Testing and Materials, 1916 Race Street, Philadelphia, Pa.; this publication is to be considered as incorporated (in toto) herein by reference.

The results of these flammability tests are shown in Table II.

TABLE II

FLAMMABILITY DATA FOR POLYESTER PLASTIC COMPOSITIONS CONTAINING BIS-PHENOXY COMPOUNDS

| FORMULATION NO. | BIS-PHENOXY COMPOUND NO. | % | ENHANCING AGENT $Sb_2O_3$, % | OXYGEN AGENT % | UL 94 |
|---|---|---|---|---|---|
| 1. | — | 0 | 0 | 22.0 | SB |
| 2. | 1 | 20 | 0 | 23.5 | SB |
| 3. | 1 | 20 | 10 | 29.0 | SE-2 |
| 4. | 3 | 20 | 0 | 23.0 | SB |
| 5. | 3 | 20 | 10 | 33.0 | SE-1 |
| 6. | 4 | 20 | 0 | 24.0 | SB |
| 7. | 4 | 20 | 10 | 28.0 | SE-2 |
| 8. | 5 | 20 | 0 | 23.5 | SB |
| 9. | 5 | 20 | 10 | 29.5 | SE-2 |
| 10. | 6 | 20 | 0 | 23.5 | SB |
| 11. | 6 | 20 | 10 | 27.5 | SE-2 |
| 12. | 8 | 20 | 0 | 24.0 | SB |
| 13. | 8 | 20 | 10 | 28.0 | SE-2 |
| 14. | 12 | 20 | 0 | 24.5 | SB |
| 15. | 12 | 20 | 10 | 29.0 | SE-2 |
| 16. | 14 | 20 | 0 | 24.5 | SB |
| 17. | 14 | 20 | 10 | 29.5 | SE-2 |
| 18. | 16 | 20 | 0 | 23.5 | SB |
| 19. | 16 | 20 | 10 | 31.0 | SE-2 |
| 20. | 17 | 20 | 0 | 23.5 | SB |
| 21. | 17 | 20 | 10 | 29.5 | SE-2 |
| 22. | 20 | 20 | 0 | 24.5 | SB |
| 23. | 20 | 20 | 10 | 30.5 | SE-2 |
| 24. | 23 | 20 | 0 | 23.0 | SB |
| 25. | 23 | 20 | 10 | 28.5 | SE-2 |
| 26. | 25 | 20 | 10 | 27.0 | SE-2 |
| 27. | — | 0 | 0 | 18.0 | SB |
| 28. | 1 | 20 | 0 | 2.5 | SB |
| 29. | 1 | 20 | 10 | 27.5 | SE-1 |
| 30. | 3 | 20 | 0 | 22.5 | SB |
| 31. | 3 | 20 | 10 | 32.0 | SE-0 |
| 32. | 4 | 20 | 0 | 20.5 | SB |

TABLE II-continued
FLAMMABILITY DATA FOR POLYESTER PLASTIC COMPOSITIONS CONTAINING BIS-PHENOXY COMPOUNDS

| FORMULATION NO. | BIS-PHENOXY COMPOUND NO. | ENHANCING AGENT $Sb_2O_3$, % | OXYGEN AGENT % | UL 94 |
|---|---|---|---|---|
| 33. | 4 | 20 | 10 | 28.0 | SE-1 |
| 34. | 5 | 20 | 0 | 21.0 | SB |
| 35. | 5 | 20 | 10 | 28.5 | SE-1 |
| 36. | 6 | 20 | 0 | 20.5 | SB |
| 37. | 6 | 20 | 10 | 28.5 | SE-1 |
| 38. | 8 | 20 | 0 | 21.0 | SB |
| 39. | 8 | 20 | 10 | 28.0 | SE-1 |
| 40. | 12 | 20 | 0 | 21.5 | SB |
| 41. | 12 | 20 | 10 | 29.0 | SE-1 |
| 42. | 14 | 20 | 0 | 22.0 | SB |
| 43. | 14 | 20 | 10 | 29.5 | SE-0 |
| 44. | 16 | 20 | 0 | 21.0 | SB |
| 45. | 16 | 20 | 10 | 30.5 | SE-0 |
| 46. | 17 | 20 | 0 | 21.5 | SB |
| 47. | 17 | 20 | 10 | 29.0 | SE-0 |
| 48. | 20 | 20 | 0 | 22.0 | SB |
| 49. | 20 | 20 | 10 | 31.0 | SE-0 |
| 50. | 23 | 20 | 0 | 21.0 | SB |
| 51. | 23 | 20 | 10 | 28.5 | SE-1 |
| 52. | 25 | 20 | 10 | 26.5 | SE-2 |

Referring to Table II, the bis-phenoxy compound number relates to the structural formulae heretofore set forth in Table I; a difference of 2% in the Oxygen Index values is considered significant; and the UL 94 values are on a graduated scale wherein the highest degree to lowest degree of flame retardancy is respectively SE-0, SE-1, SE-2, SB and Burns.

The results shown in Table II demonstrate the unique effectiveness of these bis-phenoxys as flame retardants for polyesters. With reference to the saturated polyester based formulations (Nos. 1–26), formulation No. 1 (the control) had a O.I. of 22.0 and UL 94 value of SB. The even numbered formulations, employing the use of the particular bis-phenoxy compound all show an increase in fire retardancy as measured by O.I. While some formulations have a SB rating (UL 94), the individual U.L. rating covers a wide range and consequently, in these cases, the O.I. numbers are more indicative of increased flame retardancy. The use of an enhancing agent such as $Sb_2O_3$ to promote a cooperative effect between such agent and the bis-phenoxy compound is fully demonstrated via the results obtained from testing the odd numbered formulations. The highest UL 94 ratings and significantly higher O.I. values are obtained when using an enhancing agent.

The results obtained using an unsaturated polyester, are basically similar to those obtained using the saturated polyester. Formulation Nos. 28-52 all demonstrated a significant increase in O.I. values as compared to the control, No. 27.

EXAMPLE II

Portions of the solid samples of Formulation Nos. 1-52 prepared according to the above described procedure of Example I are subjected to the following ASTM tests in order to ascertain other properties of the resultant plastic composition:

(1) Tensile Strength (at break) : ASTM Test No. D638-61T;
(2) Flexural Strength : ASTM Test No. D790-63;
(3) Flexural Modulus : ASTM Test No. D790-63;
(4) Notched Izod Impact : ASTM Test No. D256-56; and
(5) Heat Distortion Temperature (HDT) : ASTM Test No. D648-56.

Each of the aforementioned ASTM Tests are standard tests in the art and are utilized collectively in order to ascertain the efficacy of a polymeric system as an overall flame retarded composition for commercial application. (Formulation Nos. 27–52 are not subjected to the Izod Impact test since they are not reinforced and consequently, impact testing is not appropriate since any data obtained would not have significant meaning). All of these ASTM Tests are to be considered as incorporated herein by reference.

The results of these ASTM tests show that the physical properties of the present invention compositions are basically the same (except O.I. and UL 94 values) as the plastic material without the flame retardant (i.e. formulation Nos. 1 and 27). Thus, there is no substantial adverse effect on the physical properties of the plastic material when the novel compounds are incorporated therein.

EXAMPLE III

The procedure of Examples I and II are repeated except that the enhancing agent used is zinc borate instead of $Sb_2O_3$. Substantially the same results are obtained using zinc borate as those obtained using $Sb_2O_3$.

EXAMPLE IV

Strip samples of each of Formulation Nos. 1 through 52 Table II, are subjected to light stability tests via the use of a "Weather-Ometer", model 25/18 W. R., Atlas Electrical Devices Company, Chicago, Ill. Utilizing an operating temperature of 145°F and a 50% relative humidity, each strip is subjected to 200 hours of "simulated daylight" via the use of a carbon arc. The results show that after 200 hours, there is no significant discoloration in any strip tested and which demonstrates that the present invention compositions are highly resistant to deterioration by light.

EXAMPLE V

Samples of each of Formulation Nos. 1 through 52 Table II, are subjected to temperature (thermal) stability tests via the use of thermal gravimetric analysis (TGA). This test employed the use of a "Thermal Balance," model TGS-1, Perkin-Elmer Corporation, Norwalk, Conn., and an electrical balance, Cahn 2580 model, Cahn Instrument Company, Paramount, Calif. The results of these tests show that the bis-phenoxy compound containing Formulations has more than adequate stability for melt processing and subsequent heat aging (i.e. high temperature applications) and thus demonstrating that the particular bis-phenoxy are quite compatible with the plastic material. The bis-phenoxy compound stability thus aids in providing sufficient flame retardancy at the plastic decomposition temperature. This test also demonstrates that these compounds do not exhibit migration.

In view of the foregoing Examples and remarks, it is seen that the plastic compositions, which incorporate these compounds, possess characteristics which have been unobtainable in the prior art. Thus, the use of these compounds in the above described plastic material as flame retardants therefor is quite unique since it is not possible to predict the effectiveness and functionality of any particular material in any polymer system until it is actively undergone incorporation therein and the resultant plastic composition tested according to various ASTM Standards. Furthermore, it is necessary, in order to have commercial utility, that the resultant flame retarded plastic composition possess characteristics such as being non-toxic. Use of these compounds in the plastic material has accomplished all of these objectives.

The above examples have been described in the foregoing specification for the purpose of illustration and not limitation. Many other modifications and ramifications will naturally suggest themselves to those skilled in the art based on this disclosure. These are intended to be comprehended as within the scope of this invention.

What is claimed is:

1. A plastic composition consisting essentially of polyester having incorporated therein an effective amount of a flame retardant which is a compound having the formula:

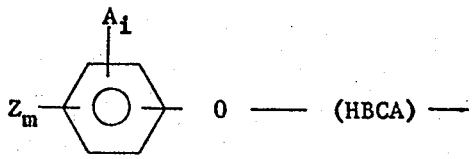

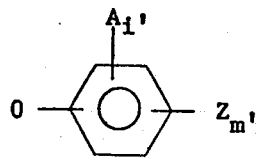

wherein Z is selected from the group consisting of bromine or chlorine; $m$ and $m'$ are integers having a value of 1–5; $i$ and $i'$ are integers having a value of 0–2; HBCA is a halo-branched chain alkylene group having from 1 to 6 carbon atoms; and A is selected from the group consisting of cyano, nitro, lower alkoxy, lower alkyl, fluorine, dialkylamino, phenyl, halo-phenyl, benzyl and halo-benzyl, with the proviso that neither $m + i$ nor $m' + i'$ is greater than 5.

2. The composition as set forth in claim 1 wherein $i$ and $i'$ are both 0.

3. A plastic composition containing polyester having incorporated therein an effective amount of a flame retardant which is a compound having the formula:

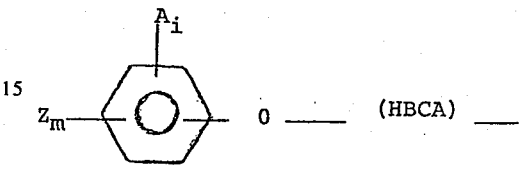

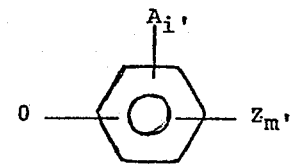

wherein Z is selected from the group consisting of bromine or chlorine; $m$ and $m'$ are integers having a value of 1–4; $i$ and $i'$ are integers having a value of 1–2; HBCA is a halo-branched chain alkylene group having from 1 to 6 carbon atoms; and A is selected from the group consisting of cyano, nitro, lower alkoxy, lower alkyl, fluorine, dialkylamino, phenyl, halo-phenyl, benzyl and halo-benzyl, with the proviso that neither $m + i$ nor $m' + i'$ is greater than 5.

4. The composition as set forth in claim 3 wherein $i$ and $i'$ are both 2.

5. The composition as set forth in claim 3 wherein Z is bromine and A is cyano.

6. The composition as set forth in claim 3 wherein Z is bromine and A is nitro.

7. The composition as set forth in claim 3 wherein Z is bromine and A is lower alkoxy.

8. The composition as set forth in claim 3 wherein Z is bromine and A is lower alkyl.

9. The composition as set forth in claim 3 wherein Z is bromine and A is fluorine.

10. The composition as set forth in claim 3 wherein Z is bromine and A is dialkylamino.

11. The composition as set forth in claim 3 wherein Z is bromine and A is phenyl.

12. The composition as set forth in claim 3 wherein Z is bromine and A is halo-phenyl.

13. The composition as set forth in claim 3 wherein Z is bromine and A is benzyl.

14. The composition as set forth in claim 3 wherein Z is bromine and A is halo-benzyl.

* * * * *